United States Patent
Garcia-Luna-Aceves

(10) Patent No.: US 10,003,520 B2
(45) Date of Patent: Jun. 19, 2018

(54) SYSTEM AND METHOD FOR EFFICIENT NAME-BASED CONTENT ROUTING USING LINK-STATE INFORMATION IN INFORMATION-CENTRIC NETWORKS

(71) Applicant: CISCO TECHNOLOGY, INC., San Jose, CA (US)

(72) Inventor: Jose J. Garcia-Luna-Aceves, San Mateo, CA (US)

(73) Assignee: Cisco Technology, Inc., San Jose, CA (US)

(*) Notice: Subject to any disclaimer, the term of this patent is extended or adjusted under 35 U.S.C. 154(b) by 492 days.

(21) Appl. No.: 14/579,925

(22) Filed: Dec. 22, 2014

(65) Prior Publication Data
US 2016/0182353 A1    Jun. 23, 2016

(51) Int. Cl.
*H04L 12/721* (2013.01)
*H04L 12/725* (2013.01)

(52) U.S. Cl.
CPC ........... *H04L 45/12* (2013.01); *H04L 45/306* (2013.01); *H04L 45/38* (2013.01)

(58) Field of Classification Search
CPC ... H04L 45/12; H04L 45/306; H04L 12/6418; H04L 45/20; H04L 67/327; H04N 21/64746; H04N 21/84
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,265,092 A * | 11/1993 | Soloway ............. H04L 45/18 370/238 |
| 5,377,354 A | 12/1994 | Scannell |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

Hiryanto et al., (Efficient Prefix Updates for IP Router Using Lexicographic Ordering and Updateable Address Set, Jan. 2008, IEEE Computer Society, vol. 57, No. 1, pp. 110-125).*

(Continued)

*Primary Examiner* — Vivek Srivastava
*Assistant Examiner* — Muhammad Raza

(57) ABSTRACT

One embodiment of the present invention provides a system for updating link-status information associated with a prefix in an information-centric network (ICN). During operation, a first node in the ICN receives a link-state advertisement (LSA) message from a neighbor node with the LSA message specifying a prefix and an anchor node advertising the specified prefix. The system determines, based on topology information stored on the first node, whether a shortest-path condition is met, and forwards the received LSA message to other neighbors of the first node in response to the shortest-path condition being met.

20 Claims, 7 Drawing Sheets

(56) References Cited

U.S. PATENT DOCUMENTS

| | | |
|---|---|---|
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 * | 10/2013 | Garcia-Luna-Aceves ............... G06F 12/1483 370/238 |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,863,227 B2 * | 10/2014 | Zhang ............... G06F 21/10 713/171 |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |

(56) References Cited

U.S. PATENT DOCUMENTS

| | | |
|---|---|---|
| 9,326,042 B2* | 4/2016 | Hong .............. H04N 21/64784 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0101869 A1* | 8/2002 | Garcia-Luna-Aceves ............. H04L 45/025 370/389 |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0026268 A1* | 2/2003 | Navas .............. H04L 29/12009 370/400 |
| 2003/0033394 A1* | 2/2003 | Stine ............... H04L 12/5695 709/222 |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0117966 A1* | 6/2003 | Chen ................. H04L 45/02 370/255 |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0021622 A1* | 1/2005 | Cullen ............... G06Q 30/02 709/204 |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0140136 A1* | 6/2006 | Filsfils ............. H04L 45/02 370/255 |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0245374 A1* | 11/2006 | Patel ............... H04L 45/04 370/254 |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0214275 A1* | 9/2007 | Mirtorabi ............ H04L 45/02 709/230 |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0170518 A1* | 7/2008 | Duggi ............... H04L 45/18 370/310 |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |

(56) References Cited

U.S. PATENT DOCUMENTS

| | | |
|---|---|---|
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0161578 A1* | 6/2009 | Yeung ............... H04L 45/02 370/254 |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1* | 11/2009 | Jacobson ............ H04L 67/104 709/229 |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | Vanderlinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0039164 A1* | 2/2012 | Enyedi ............... H04L 45/00 370/217 |
| 2012/0045064 A1 | 2/2012 | Rembarz |
| 2012/0047361 A1 | 2/2012 | Erdmann |
| 2012/0051212 A1* | 3/2012 | Xu ............... H04L 41/0659 370/223 |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0207159 A1* | 8/2012 | Buchko ............... H04L 45/16 370/390 |
| 2012/0221150 A1 | 8/2012 | Arensmeier |
| 2012/0224487 A1 | 9/2012 | Hui |
| 2012/0226902 A1 | 9/2012 | Kim |

(56) References Cited

U.S. PATENT DOCUMENTS

| | | | |
|---|---|---|---|
| 2012/0236860 A1* | 9/2012 | Kompella | H04L 45/18 370/392 |
| 2012/0257500 A1 | 10/2012 | Lynch | |
| 2012/0284791 A1 | 11/2012 | Miller | |
| 2012/0290669 A1 | 11/2012 | Parks | |
| 2012/0290919 A1 | 11/2012 | Melnyk | |
| 2012/0291102 A1 | 11/2012 | Cohen | |
| 2012/0297088 A1* | 11/2012 | Wang | H04L 63/0272 709/238 |
| 2012/0300669 A1 | 11/2012 | Zahavi | |
| 2012/0307629 A1 | 12/2012 | Vasseur | |
| 2012/0314580 A1 | 12/2012 | Hong | |
| 2012/0317307 A1* | 12/2012 | Ravindran | H04L 12/6418 709/238 |
| 2012/0322422 A1 | 12/2012 | Frecks | |
| 2012/0323933 A1 | 12/2012 | He | |
| 2012/0331112 A1 | 12/2012 | Chatani | |
| 2013/0024560 A1 | 1/2013 | Vasseur | |
| 2013/0039249 A1* | 2/2013 | Ravindran | H04W 76/002 370/312 |
| 2013/0041982 A1 | 2/2013 | Shi | |
| 2013/0051392 A1 | 2/2013 | Filsfils | |
| 2013/0054971 A1 | 2/2013 | Yamaguchi | |
| 2013/0060962 A1* | 3/2013 | Wang | H04L 67/327 709/238 |
| 2013/0061084 A1 | 3/2013 | Barton | |
| 2013/0066823 A1 | 3/2013 | Sweeney | |
| 2013/0073552 A1 | 3/2013 | Rangwala | |
| 2013/0073882 A1 | 3/2013 | Inbaraj | |
| 2013/0074155 A1 | 3/2013 | Huh | |
| 2013/0090942 A1 | 4/2013 | Robinson | |
| 2013/0091539 A1 | 4/2013 | Khurana | |
| 2013/0110987 A1 | 5/2013 | Kim | |
| 2013/0111063 A1 | 5/2013 | Lee | |
| 2013/0128786 A1 | 5/2013 | Sultan | |
| 2013/0132719 A1 | 5/2013 | Kobayashi | |
| 2013/0139245 A1 | 5/2013 | Thomas | |
| 2013/0151584 A1 | 6/2013 | Westphal | |
| 2013/0151646 A1 | 6/2013 | Chidambaram | |
| 2013/0152070 A1 | 6/2013 | Bhullar | |
| 2013/0163426 A1 | 6/2013 | Beliveau | |
| 2013/0166668 A1 | 6/2013 | Byun | |
| 2013/0173822 A1 | 7/2013 | Hong | |
| 2013/0182568 A1 | 7/2013 | Lee | |
| 2013/0182931 A1 | 7/2013 | Fan | |
| 2013/0185406 A1 | 7/2013 | Choi | |
| 2013/0191412 A1 | 7/2013 | Kitamura | |
| 2013/0197698 A1 | 8/2013 | Shah | |
| 2013/0198119 A1 | 8/2013 | Eberhardt, III | |
| 2013/0212185 A1 | 8/2013 | Pasquero | |
| 2013/0219038 A1 | 8/2013 | Lee | |
| 2013/0219081 A1 | 8/2013 | Qian | |
| 2013/0219478 A1 | 8/2013 | Mahamuni | |
| 2013/0223237 A1 | 8/2013 | Hui | |
| 2013/0227048 A1 | 8/2013 | Xie | |
| 2013/0227114 A1 | 8/2013 | Vasseur | |
| 2013/0227166 A1 | 8/2013 | Ravindran | |
| 2013/0242996 A1 | 9/2013 | Varvello | |
| 2013/0250809 A1 | 9/2013 | Hui | |
| 2013/0262365 A1 | 10/2013 | Dolbear | |
| 2013/0262698 A1 | 10/2013 | Schwan | |
| 2013/0282854 A1 | 10/2013 | Jang | |
| 2013/0282860 A1 | 10/2013 | Zhang | |
| 2013/0282920 A1 | 10/2013 | Zhang | |
| 2013/0304758 A1 | 11/2013 | Gruber | |
| 2013/0304937 A1 | 11/2013 | Lee | |
| 2013/0325888 A1 | 12/2013 | Oneppo | |
| 2013/0329696 A1 | 12/2013 | Xu | |
| 2013/0332971 A1 | 12/2013 | Fisher | |
| 2013/0336103 A1 | 12/2013 | Vasseur | |
| 2013/0336323 A1 | 12/2013 | Srinivasan | |
| 2013/0339481 A1 | 12/2013 | Hong | |
| 2013/0343408 A1 | 12/2013 | Cook | |
| 2014/0003232 A1 | 1/2014 | Guichard | |
| 2014/0003424 A1 | 1/2014 | Matsuhira | |
| 2014/0006354 A1 | 1/2014 | Parkison | |
| 2014/0006565 A1 | 1/2014 | Muscariello | |
| 2014/0029445 A1 | 1/2014 | Hui | |
| 2014/0032714 A1 | 1/2014 | Liu | |
| 2014/0033193 A1 | 1/2014 | Palaniappan | |
| 2014/0040505 A1 | 2/2014 | Barton | |
| 2014/0040628 A1 | 2/2014 | Fort | |
| 2014/0043987 A1 | 2/2014 | Watve | |
| 2014/0047513 A1 | 2/2014 | vantNoordende | |
| 2014/0074730 A1 | 3/2014 | Arensmeier | |
| 2014/0075567 A1 | 3/2014 | Raleigh | |
| 2014/0082135 A1 | 3/2014 | Jung | |
| 2014/0082661 A1 | 3/2014 | Krahnstoever | |
| 2014/0089454 A1 | 3/2014 | Jeon | |
| 2014/0096249 A1 | 4/2014 | Dupont | |
| 2014/0098685 A1 | 4/2014 | Shattil | |
| 2014/0108313 A1 | 4/2014 | Heidasch | |
| 2014/0108474 A1 | 4/2014 | David | |
| 2014/0115037 A1 | 4/2014 | Liu | |
| 2014/0122587 A1 | 5/2014 | Petker et al. | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1 | 5/2014 | Kim | |
| 2014/0237095 A1 | 5/2014 | Petker | |
| 2014/0156396 A1 | 6/2014 | deKozan | |
| 2014/0160925 A1* | 6/2014 | Xu | H04L 47/17 370/235 |
| 2014/0165207 A1 | 6/2014 | Engel | |
| 2014/0172783 A1 | 6/2014 | Suzuki | |
| 2014/0172981 A1 | 6/2014 | Kim | |
| 2014/0173034 A1 | 6/2014 | Liu | |
| 2014/0173076 A1 | 6/2014 | Ravindran | |
| 2014/0181140 A1 | 6/2014 | Kim | |
| 2014/0192677 A1 | 7/2014 | Chew | |
| 2014/0192717 A1 | 7/2014 | Liu | |
| 2014/0195328 A1 | 7/2014 | Ferens | |
| 2014/0195641 A1 | 7/2014 | Wang | |
| 2014/0195666 A1 | 7/2014 | Dumitriu | |
| 2014/0204945 A1 | 7/2014 | Byun | |
| 2014/0214942 A1 | 7/2014 | Ozonat | |
| 2014/0226490 A1* | 8/2014 | Khera | H04L 45/12 370/238 |
| 2014/0233575 A1 | 8/2014 | Xie | |
| 2014/0237085 A1 | 8/2014 | Park | |
| 2014/0245359 A1 | 8/2014 | DeFoy | |
| 2014/0254595 A1 | 9/2014 | Luo | |
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0286173 A1* | 9/2014 | Bhandari | H04W 28/0236 370/238 |
| 2014/0289325 A1 | 9/2014 | Solis | |
| 2014/0289790 A1 | 9/2014 | Wilson | |
| 2014/0298248 A1 | 10/2014 | Kang | |
| 2014/0314093 A1 | 10/2014 | You | |
| 2014/0337276 A1 | 11/2014 | Iordanov | |
| 2014/0365550 A1 | 12/2014 | Jang | |
| 2015/0006571 A1* | 1/2015 | Varvello | G06F 17/30979 707/770 |
| 2015/0006896 A1 | 1/2015 | Franck | |
| 2015/0016242 A1* | 1/2015 | Ernstrom | H04L 45/122 370/218 |
| 2015/0018770 A1 | 1/2015 | Baran | |
| 2015/0023156 A1* | 1/2015 | Csaszar | H04L 45/22 370/228 |
| 2015/0032892 A1 | 1/2015 | Narayanan | |
| 2015/0033365 A1 | 1/2015 | Mellor | |
| 2015/0039890 A1 | 2/2015 | Khosravi | |
| 2015/0063802 A1 | 3/2015 | Bahadur | |
| 2015/0089081 A1 | 3/2015 | Thubert | |
| 2015/0095481 A1 | 4/2015 | Ohnishi | |
| 2015/0095514 A1 | 4/2015 | Yu | |
| 2015/0103671 A1* | 4/2015 | Ernstrom | H04L 41/0659 370/238 |

(56) References Cited

U.S. PATENT DOCUMENTS

| | | | | |
|---|---|---|---|---|
| 2015/0109934 | A1* | 4/2015 | Harshavardha | H04L 45/125 370/238 |
| 2015/0120663 | A1 | 4/2015 | LeScouarnec | |
| 2015/0169758 | A1 | 6/2015 | Assom | |
| 2015/0188770 | A1 | 7/2015 | Naiksatam | |
| 2015/0195149 | A1 | 7/2015 | Vasseur | |
| 2015/0207633 | A1 | 7/2015 | Ravindran | |
| 2015/0207864 | A1 | 7/2015 | Wilson | |
| 2015/0236752 | A1* | 8/2015 | Cruz | H04K 1/003 375/135 |
| 2015/0279348 | A1 | 10/2015 | Cao | |
| 2015/0288755 | A1 | 10/2015 | Mosko | |
| 2015/0312300 | A1 | 10/2015 | Mosko | |
| 2015/0349961 | A1 | 12/2015 | Mosko | |
| 2015/0350062 | A1* | 12/2015 | Lindem, III | H04L 45/22 370/220 |
| 2015/0372903 | A1 | 12/2015 | Hui | |
| 2015/0381546 | A1 | 12/2015 | Mahadevan | |
| 2016/0019275 | A1 | 1/2016 | Mosko | |
| 2016/0021172 | A1 | 1/2016 | Mahadevan | |
| 2016/0062840 | A1 | 3/2016 | Scott | |
| 2016/0087887 | A1* | 3/2016 | Fung | H04L 49/3009 370/401 |
| 2016/0110466 | A1 | 4/2016 | Uzun | |
| 2016/0171184 | A1 | 6/2016 | Solis | |
| 2016/0255001 | A1* | 9/2016 | Wang | H04L 12/6418 370/392 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2015084327 | 6/2015 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network &oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
A. Wolman, M. Voelker, N. Sharma N. Cardwell,Aa. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed

(56) References Cited

OTHER PUBLICATIONS computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer Sciencevol. 5443 (2009).

Jacobson, Van et al. 'VoCCN: Voice Over Content-Centric Networks.' Dec. 1, 2009. ACM ReArch'09.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

(56) References Cited

OTHER PUBLICATIONS

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pan Dey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. Acm CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Yi, Cheng, et al. 'A case for stateful forwarding plane.' Computer Communications 6.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireiess sensor networks." European Transactions on Telecommunications 21.4 (2010): 386-395.
Zhang, et al., "Named Data Networking (NDN) Project", http://www.parc.com/publication/2709/named-data-networking-ndn-project.htmI, Oct. 2010. NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions On Computers, vol. 57, No. 1.
Beben et al., "Content Aware Network based on Virtual Infrastructure", 2012 13th ACIS International Conference on Software Engineering.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking". Nov. 5, 2012, IEEE, Information and Telecommunication Technologies (APSITT), 2012 9th Asia-Pacific Symposium.

(56) References Cited

OTHER PUBLICATIONS

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/ www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Ahlgren, Bengt, et al. "A survey of information-centric networking." Communications Magazine, IEEE 50.7 (2012): 26-36.
Content Centric Networking Project (CCN) {online} http://www.ccnx.org/releases/latest/doc/technical.
Content Mediator Architecture for Content-aware Networks (COMET) Project {online} http://www.comet-project.org/.
Detti, Andrea, et al. "CONET: a content centric inter-networking architecture." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Jacobson, Van, et al. "Networking named content." Proceedings of the 5th international conference on Emerging networking experiments and technologies. ACM, 2009.
Hogue, A. K. M., et al. "Nlsr: Named-data link state routing protocol." Proceedings of the 3rd ACM SIGCOMM Workshop on Information-centric Networking. ACM, 2013.
NDN Project {online} http://www.named-data.net/.
Publish Subscribe Internet Technology (PURSUIT) Project {online} http://www.fp7-pursuit.eu/pursuitweb.
Scalable and Adaptive Internet Solutions (SAIL) Project {online} http://www.sail-project.eu/.
Wang, Lan, et al. "OSPFN: An OSPF based routing protocol for Named Data Networking." University of Memphis and University of Arizona, Tech. Rep (2012).
Xylomenos, George, et al. "A survey of information-centric networking research." Communications Surveys & Tutorials, IEEE 16.2 (2014): 1024-1049.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Xie et al. "Collaborative Forwarding and Caching in Content Centric Networks", Networking 2012.
Boneh, et al., "Collusion Resistant Broadcast Encryption with Short Ciphertexts and Private Keys," Advances in Cryptology—CRYPTO 2005, Aug. 2005, 19 pages.
Xiong, et al., "CloudSeal: End-to-End Content Protection in Cloud-Based Storage and Delivery Services," SecureComm 2011: Security and Privacy in Communication Networks, Sep. 2011, 10 pages.
Ateniese, et al., "Improved Proxy Re-encryption Schemes with Applications to Secure Distributed Storage," ACM Transactions on Information and System Security (TISSEC), vol. 9 Issue 1, Feb. 2006, 30 pages.
Biradar, et al., "Review of Multicast Routing Mechanisms in Mobile Ad Hoc Networks," Journal of network and Computer Applications, vol. 35, Issue 1, Jan. 2012, 19 pages.
Lynn, "PBC Library—Pairing-Based Cryptography," retrieved from https://crypto.standford.edu/pbc/, on Apr. 27, 2015, 2 pages.

* cited by examiner

TOPOLOGY TABLE 200

| LINK ID | COST OF THE LINK | MOST RECENT SEQUENCE NUMBER | AGE | |
|---|---|---|---|---|
| ... | ... | ... | ... | |
| $(u,v)$ | $l_v^u$ | $sn_v^u$ | $t_v^u$ | } LSAs for physical links |
| ... | ... | ... | ... | |

202

| PREFIX | ANCHOR ROUTER | MOST RECENT SEQUENCE NUMBER | AGE | |
|---|---|---|---|---|
| ... | ... | ... | ... | |
| $j$ | $k$ | $sn_j^k$ | $t_j^k$ | } LSAs for prefixes |
| ... | ... | ... | ... | |

ROUTING TABLE 300

| PREFIX | VALID NEXT-HOP NEIGHBORS | SHORTEST-PATH NEIGHBOR |
|---|---|---|
| ... | ... | ... |
| (j) | $S_j^i = \{a, b, d, ...\}$ | $s_j^i$ |
| ... | ... | ... |

SYSTEM AND METHOD FOR EFFICIENT NAME-BASED CONTENT ROUTING USING LINK-STATE INFORMATION IN INFORMATION-CENTRIC NETWORKS

BACKGROUND

Field

The present disclosure relates generally to an information-centric network (ICN). More specifically, the present disclosure relates to a system and method for content routing using link-state information in ICNs.

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric Networking (CCN), an exemplary ICN architecture brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the ICN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

At the core of all ICN architectures are name resolution and routing of content, and several approaches have been proposed. In some ICN architectures, the names of data objects are mapped into addresses by means of directory servers, and then address-based routing is used for content delivery. By contrast, a number of ICN architectures use name-based routing of content, which integrates name resolution and content routing. With name-based routing, some of the routers (producers or caching sites) advertise the existence of local copies of named data objects (NDO) or name prefixes denoting a set of objects with names sharing a common prefix, and routes to them are established; the consumers of content issue content requests that are forwarded along the routes to the routers that issued the NDO or name prefix advertisements.

Among the various ICN architectures, CCN uses distributed routing protocols to establish routes over which content requests are forwarded. In CCN, a content request (called an "Interest") may be sent over one or multiple paths to a name prefix. Some CCN schemes use existing Internet routing protocol, such as link-state Interior Gateway Protocol (IGP), for intra-domain routing, where routers describe their local connectivity and adjacent resources (content). It has also been proposed to integrate domain-level content prefixes into existing Border Gateway Protocol (BGP) to solve the problem of inter-domain content routing.

Exemplary content routing schemes in ICNs include NLSR (Named-data Link State Routing Protocol) and OSPFN (OSPN for Named-data). In both protocols, routers exchange topology information by flooding two types of link-state advertisements (LSA). LSAs can describe the state of physical links just as it is done in traditional link-state routing protocols. In addition, routers flood LSAs about the prefixes for which they have local copies. It is also possible to use distributed hash tables (DHT) running in overlays over the physical infrastructure to accomplish name-based routing, and in such situations, the routing protocol used in the underlay typically consists of a link-state protocol.

One of the problems facing the existing link-state based routing protocols is that they require each router to receive information, such as LSAs, about all replicas of each published named data object or name prefix advertised in the network, and hence are not scalable.

SUMMARY

One embodiment of the present invention provides a system for updating link-status information associated with a prefix in an information-centric network (ICN). During operation, a first node in the ICN receives a link-state advertisement (LSA) message from a neighbor node with the LSA message specifying a prefix and an anchor node advertising the specified prefix. The system determines, based on topology information stored on the first node, whether a shortest-path condition is met, and forwards the received LSA message to other neighbors of the first node in response to the shortest-path condition being met.

In a variation on this embodiment, determining whether the shortest-path condition is met involves computing, using a shortest-path first (SPF) algorithm, a shortest distance from the first node to the specified prefix.

In a variation on this embodiment, the first node generates an LSA message reflecting a status change to a local prefix and forwards the generated LSA message to neighbors of the first node.

In a variation on this embodiment, the first node updates a routing table based on the received LSA message.

In a further variation, updating the routing table involves identifying a set of valid next-hop neighbors to the prefix, and identifying a respective valid next-hop neighbor involves determining whether the valid next-hop neighbor is closer to the anchor node than the first node, thereby preventing formation of a loop in the updated routing table.

In a further variation, in response to the valid next-hop neighbor having a same distance to the anchor node as that of the first node, the system determines whether the valid next-hop neighbor has a smaller lexicographic value compared with the first node.

In a variation on this embodiment, the LSA message further includes a sequence number created by the anchor node, and the sequence number increments each time the anchor node updates the LSA message for the specified prefix.

BRIEF DESCRIPTION OF THE FIGURES

FIG. 2 presents a diagram illustrating an exemplary topology table maintained at a router, in accordance with an embodiment of the present invention.

FIG. 3 presents a diagram illustrating an exemplary routing table maintained at a router, in accordance with an embodiment of the present invention.

In the figures, like reference numerals refer to the same figure elements.

DETAILED DESCRIPTION

Overview

Figure 1:
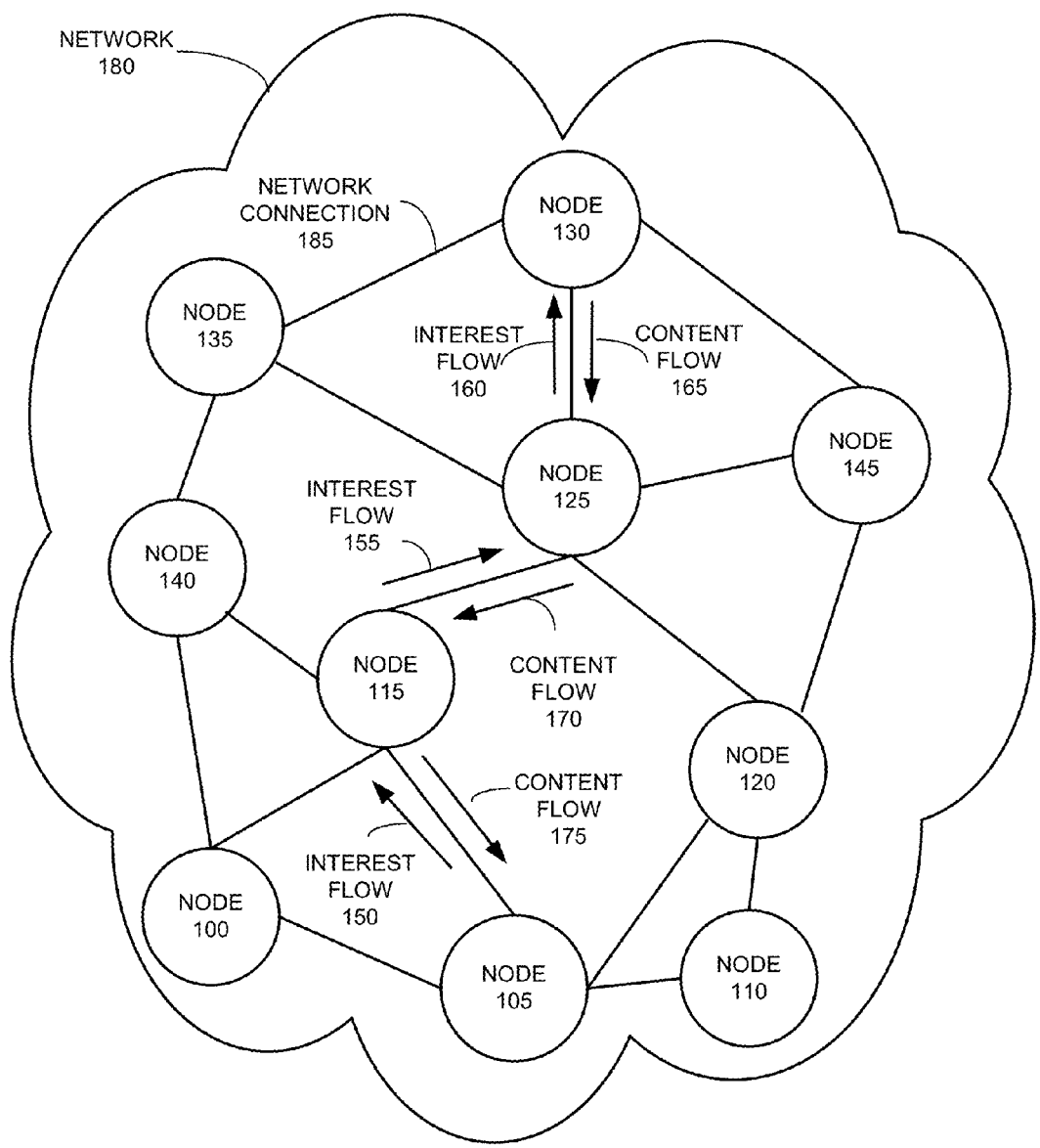
FIG. 1 illustrates an exemplary architecture of a network, in accordance with an embodiment of the present invention.

Embodiments of the present invention provide a system for content routing based on link-state information in an information-centric network (ICN). More specifically, the link-state content routing (LCR) system operates by having routers maintain a number of tables, including a link cost table, a topology table, a routing table, and an anchor table. Information stored in these tables can be updated periodically by routers. The topology table is updated when a router receives link-state advertisements (LSAs) from its neighbors. The routing table can be computed and updated by means of the shortest path first (SPF) algorithm. Compared with conventional link-state based routing, in the LCR system, routers do not flood the network LSAs regarding all replicas of a name prefix. Instead, an LSA regarding a name prefix is set up in such a way that each router reports only one replica (often the nearest) for each name prefix.

Exemplary CCN Architecture

To demonstrate the operations of a link-state content routing (LCR) system, this disclosure uses CCN as an example. However, the operations of the LCR system is not limited to CCN. In general, LCR can be applied to any other type of ICN networks.

CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also the HSVLI may not be human readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARIDNG A PACKET WITH A HIERARCHICHALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and optionally other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. In this disclosure, the term "Content Object" and the term "Named Data Object (NDO)" are exchangeable.

"Face:" In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the term "face," refereeing to incoming or outgoing interface of an Interest.

"Prefix:" In this disclosure, the term "prefix" can be used to refer to either a name of a specific content object or a name prefix for the content object.

"Anchor:" In this disclosure, the term "anchor" is used to refer to a router that advertises content. More specifically, a router (or a node) that advertises for some or all of the content corresponding to a prefix is referred to as an anchor of the prefix.

As mentioned before, an HSVLI indicates a piece of content, is hierarchically structured, and includes contiguous components ordered from a most general level to a most specific level. The length of a respective HSVLI is not fixed.

In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message and thus reaches the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

A Link-State Content Routing (LCR) System

The operation of an LCR system assumes that: (a) each network node is assigned a name with a flat or hierarchical structure; (b) each piece of content is a named data object (NDO) that can be requested by name; (c) NDOs can be denoted using either flat or hierarchical naming (such as HSVLI-based naming), and the same naming convention is used for the entire system; and (d) routers cache content opportunistically.

When hierarchical naming is used, there are different ways for routers to advertise their NDOs. For example, routers can be allowed to advertise a name prefix only if they have local copies of all NDOs associated with the name prefix. Alternatively, routers with subsets of the NDOs of the name prefix can be allowed to advertise the name prefix. In this disclosure, a router that advertises storing some or all of the content corresponding to a name or name prefix is called an anchor of the name or name prefix.

In order to implement LCR, routers in the ICN maintain a number of data structures, including a link cost table, a topology table ($TT^i$), a routing table ($RT^i$), and an anchor table ($AT^i$).

The link cost table for a router i ($LT^i$) lists the cost of the links from router i to each of its neighbors. In this disclosure, the link from router i to router k is denoted as (i,k) and the cost of the link is denoted as $l_k^i$. In some embodiments, the cost of the link is assumed to be a positive number, which can be a function of administrative constraints and performance measurements made by router i for the link.

The topology table ($TT^i$) maintained by a router i states the link-state information reported or forwarded by each neighbor for each router and each known prefix. In some embodiments, the information stored in $TT^i$ includes the links from i to each neighbor and to each locally available prefix, as well as the links to nodes or prefixes forwarded by neighbor routers. Note that the links to nodes are considered physical links, whereas the links to prefixes are considered virtual links. For example, a sub-table $TT_m^i$ within $TT^i$ includes links to nodes or prefixes forwarded by a neighbor router m.

FIG. 2 presents a diagram illustrating an exemplary topology table maintained at a router, in accordance with an embodiment of the present invention. In FIG. 2, a topology table 200 maintained by a router i includes two different types of link-state advertisement (LSA) entries. The first type of LSA entries are used to store information associated with physical links, and are indexed by the link identifiers. Such LSA entries can include the link identifiers, the cost function for the link, a sequence number, and a lifetime. For example, entry 202 represents an LSA stored in router i for link (u,v), and includes the link identifier (u,v), the cost of the link $l_v^u$, the most recent sequence number known by i that was created by u for the link $sn_v^u$, and the age (remaining lifetime) of the LSA $t_v^u$. In some embodiments, an LSA stored in router i for link (u,v) is denoted as $l^i[(u,v), l_v^u, sn_v^u, t_v^u]$.

On the other hand, the second type of LSA entries are used to store information associated with virtual links (prefixes), and are indexed by the prefixes. Such LSA entries can include the prefix, an anchor to the prefix, a sequence number, and a lifetime. For example, entry 204 represents an LSA stored in router i for a prefix j advertised by an anchor router k. The entry includes the name of the prefix j, the name of the router that act as an anchor of the prefix j, the most recent sequence number known by i that was created by k for the prefix $sn_j^k$, and the age (remaining lifetime) of the LSA $t_j^k$. In some embodiments, an LSA stored in router i for a prefix j advertised by an anchor router k is denoted as $p^i[k, j, sn_j^k, t_j^k]$.

Note that the age of an LSA is decremented monotonically while the LSA is stored in the topology table. An LSA, either for a physical link or a virtual link, will be deleted when its age reaches zero value (also known as being expired). To reflect changes of the network topology or the location of content (the prefix), routers in the network send update messages periodically. For example, a router i may periodically send an update message to its neighbor k, with the update message containing changes made to its topology table $TT^i$.

The graph stored in $TT^i$ is such that each physical link between two routers u and v corresponds to two directed links (u,v) and (v,u), and for each copy of a prefix j maintained at router u there is only a directed link (u, j). Hence, the shortest-path first algorithm or any other shortest-path algorithm can be executed in $TT^i$ to compute shortest paths to a prefix or a physical router, with no path to any destination (prefix or physical router) traversing a prefix node as a relay along the path.

In some embodiments, router i updates its topology table $TT^i$ when any adjacent link changes its status, new content becomes locally available, or an LSA is received. If router i receives a link LSA (an LSA associated with a physical link), such as $l^i[(u,v),l_v^u,sn_v^u,t_v^u]$, from a neighbor k, router i updates $TT_m^i$ for each neighbor m only if the LSA is not an expired LSA, i.e., if $t_v^u > 0$; and either (u,v) is not in $TT_k^i$ or $sn_v^u$ in the LSA is larger than the sequence number stored for (u,v) in $TT_k^i$. In other words, when router i receives a link LSA, it updates its topology table only if the link is a new link or the sequence number in the LSA is higher than the sequence number stored in the topology table for the same link, and if the LSA is not yet expired.

Similarly, if router i receives a prefix LSA (an LSA associated with a prefix), such as $p^i[u,j,sn_j^u,t_j^u]$, from a neighbor k, router i updates $TT^i$ if $t_j^u > 0$ in the LSA from k, and either (u, j) is not in $TT^i$ or $sn_j^u$ in the LSA is larger than the sequence number stored for (u, j) in $TT^i$. In other words, when router i receives a prefix LSA, it updates its topology table $TT^i$ only if the virtual link is a new link or the sequence number in the LSA is higher than the sequence number stored in the topology table for the same virtual link, and if the LSA is not yet expired.

The routing table ($RT^i$) maintained at router i stores routing information for each prefix known at router i. In some embodiments, a routing table may include a plurality of entries that are indexed by the prefix. FIG. 3 presents a diagram illustrating an exemplary routing table maintained at a router, in accordance with an embodiment of the present invention. In FIG. 3, a routing table 300 maintained by a router i includes a plurality of entries. Each entry includes the name of a prefix, a set of neighbors that are valid next hops to the prefix, and a neighbor that offers the shortest distance to the prefix. For example, entry 302 includes a prefix (j), a set of valid next-hop neighbors to j ($S_j^i$), and the shortest-path neighbor to j ($s_j \in S_j^i$).

The routing table can be updated by running the shortest-path first (SPF) algorithm. In some embodiments, router i computes the shortest paths to each prefix by running SPF with router i as the origin. The computed shortest distance from router i to each prefix j is denoted as $d_j^i$. Router i then runs SPF with each of its neighbors as the origin. The computed shortest distance via router i's neighbor k to each prefix j is denoted as $d_{jk}^i$. In some embodiments, the computed shortest distances (including the one from router i and the ones from its neighbors) to each prefix are stored in the routing table.

Figure 4:
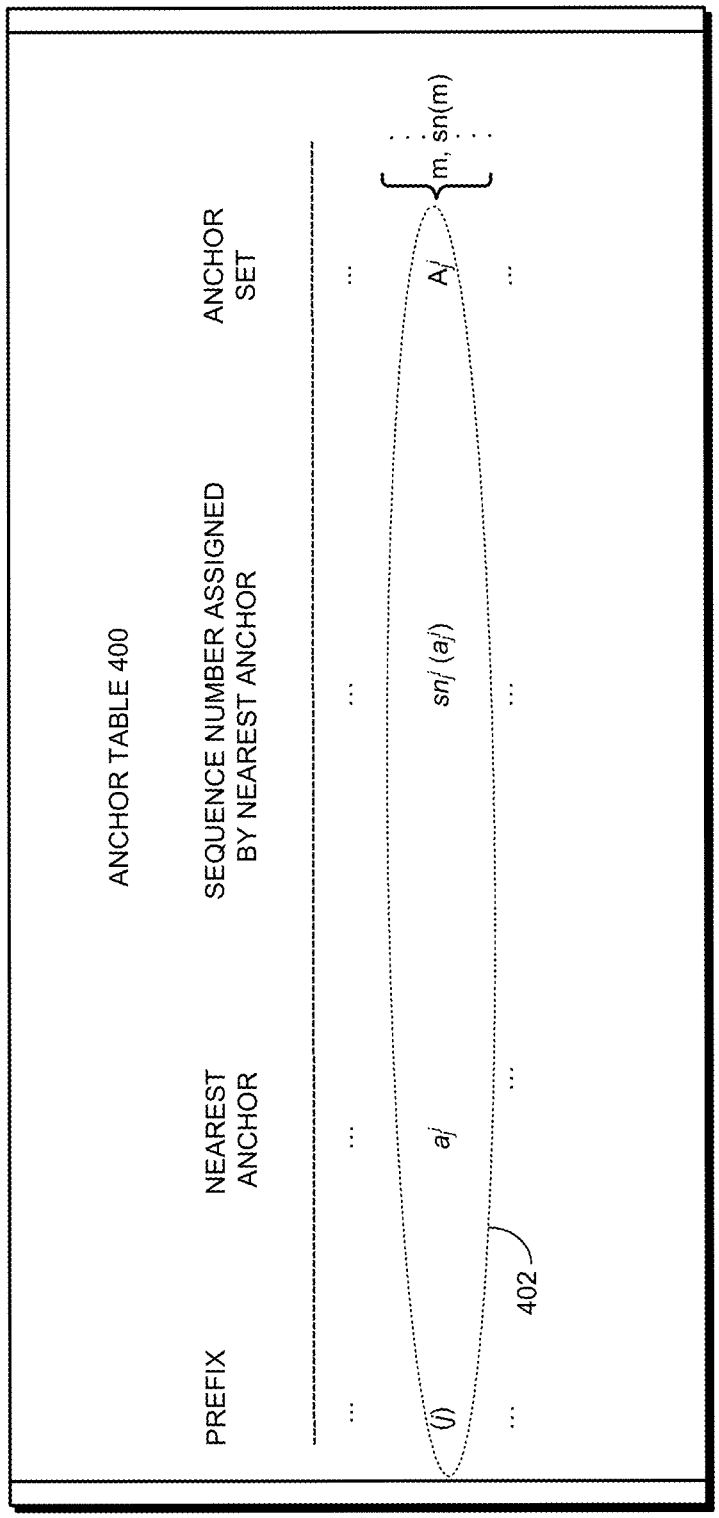
FIG. 4 presents a diagram illustrating an exemplary anchor table maintained at a router, in accordance with an embodiment of the present invention.

The anchor table ($AT^i$) maintained at router i stores the list of nearest anchor for each prefix known at router i. In some embodiments, the anchor table includes a plurality of entries that are indexed by the prefix. FIG. 4 presents a diagram illustrating an exemplary anchor table maintained at a router, in accordance with an embodiment of the present invention. In FIG. 4, an anchor table 400 maintained by a router i includes a plurality of entries. Each entry includes the name of a prefix, a nearest anchor of the prefix (which is the router that has the shortest distance and the smallest identifier reporting the prefix), a sequence number assigned to the prefix by the nearest of the prefix; and a set of valid anchors reported by any next-hop neighbor. Note that, for each valid anchor, the anchor table stores a tuple that states the name of an anchor and the sequence number reported by that anchor. For example, entry 402 includes a prefix (j), a nearest anchor of j ($a_j^i$), a sequence number assigned to j by anchor $a_j^i$ ($sn^i(a_j^i)$), and an anchor set ($A_j^i$). Note that $A_j^i$ stores a tuple $[m,sn(m)] \in A_j^i$ for different valid anchor reported by any next-hop neighbor, with m being the name of a valid anchor, and sn(m) the sequence number reported by m. The sequence number can be used to avoid a routing-table loop when the routing table is updated. Note that only the anchors of prefixes are allowed to change the sequence numbers associated with the distances to the prefixes they announce.

The updating of the anchor table can be done as part of the updating of the routing table. More specifically, when SPF is run at router i with neighbor k as the origin and the shortest distance to prefix j ($d_{jk}^i$) is obtained, router i stores the name of the neighbor, which is the router in the shortest path to prefix j with the link to prefix j, and the sequence number created by that router. After running SPF once for each neighbor of router i as the origin, router i obtains the anchor that should be reported by each neighbor for each prefix j according to the topology information stored in $TT^i$. As discussed previously, the set of anchors for prefix j reported by neighbors of router i is denoted as $A_j^i$ and is stored in the anchor table $AT^i$.

It is desirable to have a routing table that does not include any loops. To do so, in some embodiments, a router i can select neighbors as next hops to a given prefix only if their distances to valid anchors of the prefix are shorter or are the same as the distance from router i to the prefix but have lexicographically smaller names. During operation, anchors send updates about locally available prefixes periodically and increment the sequence numbers they assign to prefixes, and routers update their routing table accordingly. Note that, to sufficiently ensure that no routing-table loops are ever created when routers change their next hops, a successor-set ordering condition (SOC) must be met. The SOC states that a neighbor k (which belongs to a set $N^i$ containing router i and its neighbor routers) can become a member of $S_j^i$ the valid next hop of router i to prefix j) only if the following two statements are true:

$$\forall [m,sn(m)] \in A_j^i (a_{jk}^i \neq m \vee sn_{jk}^i \geq sn(m)); \text{ and} \quad \text{Statement (1):}$$

$$(d_j^i < \infty \wedge [d_{jk}^i < d_j^i \vee (d_{jk}^i = d_j^i \wedge |k| < |i|)] \vee (d_j^i = \infty$$
$$\wedge d_{jk}^i < d_j^i \wedge \forall v \in N^i - \{k\}([d_{jk}^i + l_k^i < d_{jv}^i + l_v^i]$$
$$\vee [d_{jk}^i + l_k^i = d_{jv}^i + l_v^i \wedge |k| < |v|])) \quad \text{Statement (2):}$$

Note that sn(m) denotes the sequence number assigned by an anchor m to prefix j in the set of anchors known to router i for prefix j ($A_j^i$), $a_{jk}^i$ denotes a nearest anchor to j reported by k, $sn_{jk}^i$ denotes the sequence number for j assigned by $a_{jk}^i$, and |i| denotes the lexicographic value of a name i.

Statement (1) specifies that only those neighbors reporting the most recent sequence numbers from known anchors of prefix j can be considered next hops. Statement (2) indicates that those neighbors are ordered lexicographically based on their distance to prefix j and their names. More specifically, if router i has a finite distance to prefix j, then it can select neighbor k as a next hop to prefix j if either router k is closer to the prefix than router i or is at the same distance to the prefix but has a smaller lexicographic value than router i (as specified by the first line of statement (2)). On the other hand, if router i has an infinite distance to prefix j, then it can choose router k as a next hop to prefix j only if k reports the smallest finite distance to j among all neighbors, or it has the smallest identifier among those neighbors reporting the smallest finite distance to j (as specified by the last three lines of statement (2)).

Figure 5:
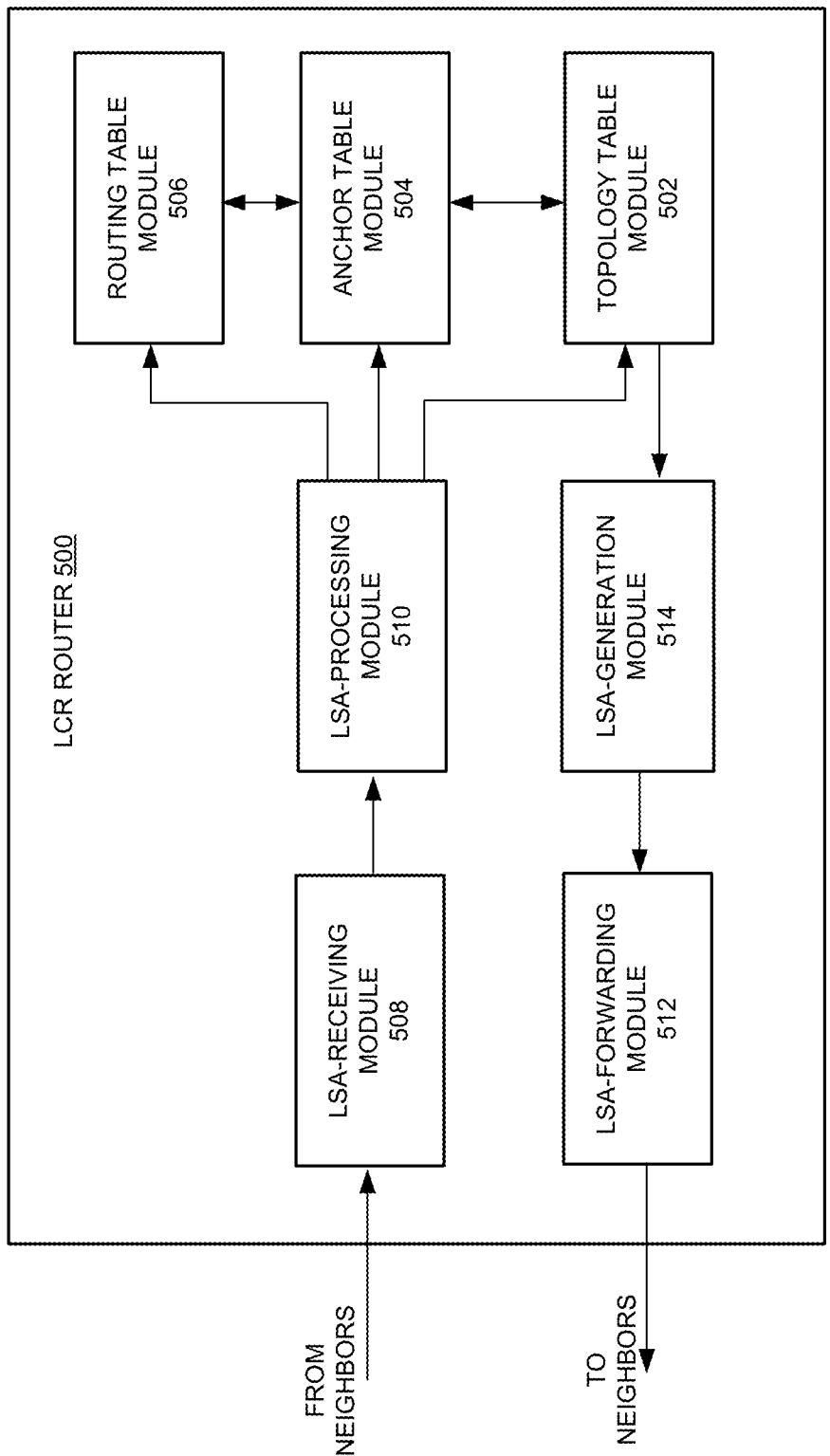
FIG. 5 presents a diagram presenting an exemplary architecture of a router that implements LCR, in accordance with an embodiment of the present invention.

FIG. 5 presents a diagram presenting an exemplary architecture of a router that implements LCR, in accordance with an embodiment of the present invention. In FIG. 5, LCR router 500 includes a topology table module 502, an anchor table module 504, a routing table module 506, an LSA-receiving module 508, an LSA-processing module 510, an LSA-forwarding module 512, and an LSA-generation module 514.

Topology table module 502 is responsible for maintaining and updating the topology table. As discussed previously, the topology table may include two types of LSA, the link LSAs and the prefix LSAs. In some embodiments, topology table module 502 updates the topology table when any adjacent link changes its status, new content becomes available, or when LSA-receiving module 508 receives an LSA. Anchor table module 504 is responsible for maintaining and updating the anchor table. In some embodiments, updating the anchor table involves running a shortest-path first (SPF) algorithm in the topology table in order to find the nearest anchor. In further embodiments, the nearest anchor is stored in the anchor table. In addition to the nearest anchor of a prefix, the anchor table also stores a set of anchors of the prefix reported by neighbor routers. Routing table module 506 is responsible for maintaining and updating the routing table, which specifies next-hop neighbors to each prefix and the shortest-path neighbor to the prefix. Similarly, the updating of the routing table involves running the SPF algorithm, not only using the router as the origin but also using the router's neighbors are origins. In some embodiments, to avoid routing-table loops, when the routing table is updated, a neighbor of the router needs to meet the SOC (both statements are true) in order to be considered a valid next hop to a particular prefix.

LSA-receiving module 508 is responsible for receiving LSAs from neighbors, LSA-processing module 510 is responsible for processing the received LSAs; and LSA-forwarding module 512 is responsible for forwarding LSAs. In some embodiments, LSA-processing module 510 examines the sequence number and the age of the received LSA. In some embodiments, LSA-processing module 510 may determine whether a received LSA is a link LSA or a prefix LSA. If the LSA received at router i from neighbor k is regarding a link (u,v), it can be denoted as $l^i[(u,v),l_v^u,sn_v^u,t_v^u]$. Note that the link LSA may include a link identifier, a cost of the link, a sequence number created by router u, and the age of the LSA.

During operation, LSA-processing module 510 may further determine whether the link identified in the LSA has been listed in the topology table. If not, the link is a new link, and LSA-forwarding module 512 forwards the LSA. In a further embodiment, the LSA is flooded throughout the network. If the link is already listed in the topology table, LSA-processing module 510 determines whether the sequence number specified in the LSA is greater than the sequence number specified by the corresponding entry in the topology table. If so, and if the age of the LSA is larger than 0, LSA-forwarding module 512 forwards the received link LSA to other neighboring routers. Otherwise, router i may drop the LSA.

If the LSA received at router i from neighbor k is regarding a prefix j, denoted as $p^i[u,j,sn_j^u,t_j^u]$, LSA-processing module 510 will determine whether the shortest distance from router i to prefix j is through the path that includes virtual link (u, j); in other words, whether anchor u is the nearest anchor of prefix j. In some embodiments, a shortest-path first (SPF) algorithm is run in order to compute the shortest path to the prefix, which also updates the routing table and the anchor table. If anchor u is the closest anchor, and if the age of the LSA is larger than 0, LSA-forwarding module 512 forwards the prefix LSA to other neighboring routers. Otherwise, router i may drop the LSA (if its age expires) or stores the LSA in its topology table (if the sequence number included in the LSA is larger than the sequence number of the existing entry in the topology table for the same virtual link).

LSA-generation module 514 is responsible for generating LSAs. In some embodiments, LSA-generation module 514 generates link LSAs regarding physical links to its neighbors periodically and whenever there are status changes in the links. For example, a router i may generate a link LSA regarding a physical link (i,v) to its neighbor router v, denoted as $l^i[(i,v),l_v^i,sn_v^i,t_v^i]$. Note that the sequence number $(sn_v^i)$ for the link LSA is incremented each time router i updates the LSA and the LSA states the maximum value for the age $t_v^i$. In some embodiments, LSA-generation module 514 generates a prefix LSA regarding a prefix periodically and whenever there is a status change in the locally available prefix. For example, a router i may generate an LSA regarding a prefix j, denoted as $p^i[i,j,sn_j^i,t_j^i]$. Note that the sequence number $(sn_j^i)$ for the LSA is incremented each time router i updates the LSA and the LSA states the maximum value for the age $t_j^i$. The generated LSAs can be forwarded to neighboring routers by LSA-forwarding module 512. Also note that only the origins of LSAs can change the sequence numbers assigned to the LSAs.

An LCR Routing Example

When routing to the nearest replica of a prefix, the router implementing LCR uses information maintained in the topology table and the anchor table to compute the routing table, and sends updates to neighboring routers periodically, or whenever there is an update to its topology table. In some embodiments, the updates are in the form of LSAs. As discussed previously, during the operation, routers implementing LCR send out LSAs to each other to update their link state information. However, the dissemination of LSAs in LCR differs from traditional link-state routing (LSR) protocols. In traditional LSR protocols, all LSAs are flooded throughout the network; whereas in LCR only LSAs regarding physical links are flooded throughout the network, and LSAs regarding prefixes propagate through the network in such a way that each router reports only one anchor (often the shortest path anchor) for any known prefix.

Figure 6:
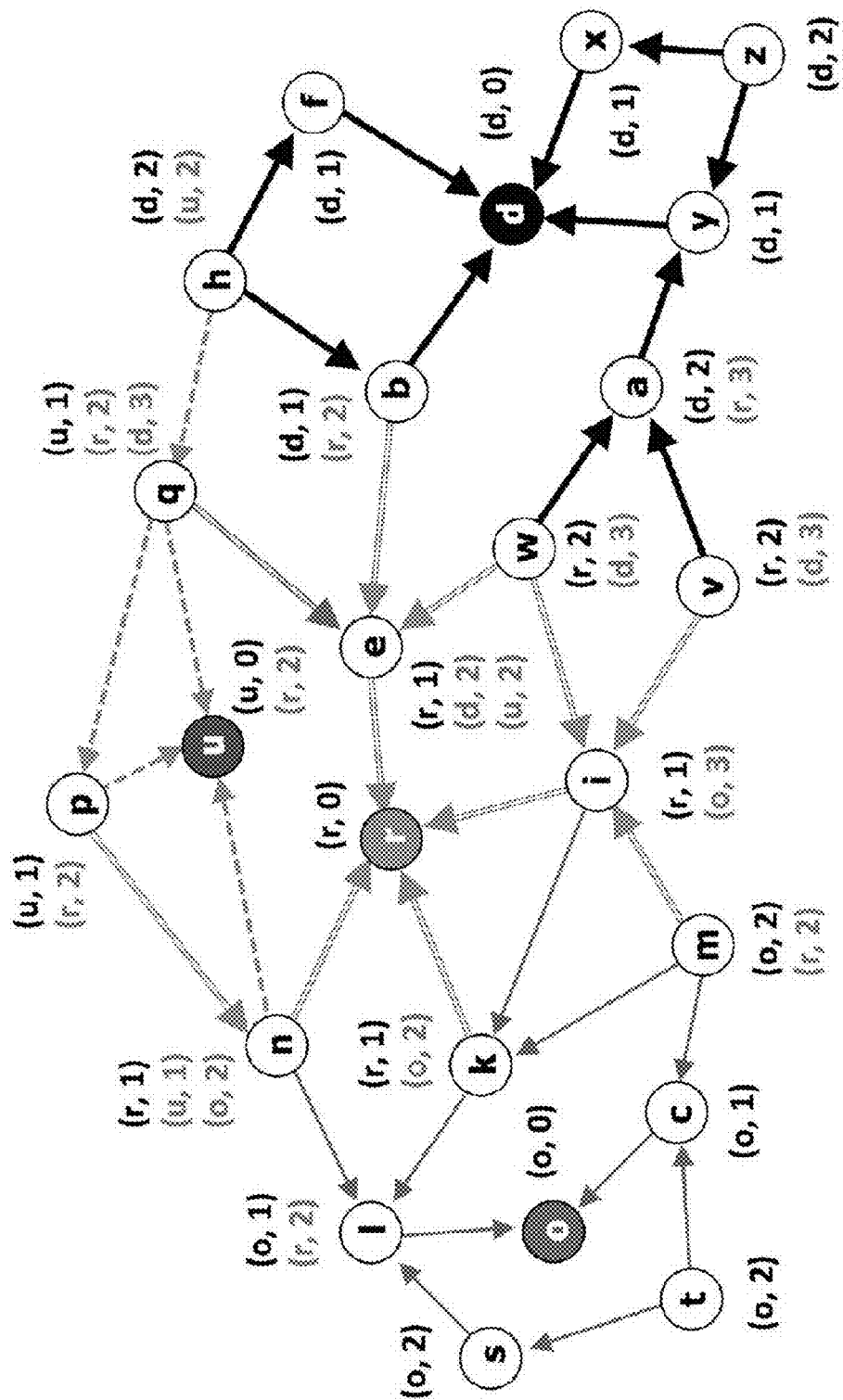
FIG. 6 presents an LCR routing example, in accordance with an embodiment of the present invention.

FIG. 6 presents an LCR routing example, in accordance with an embodiment of the present invention. In FIG. 6, a network 600 includes a plurality of routers, each identified by its name, such as routers a, b, c, . . . , x, y, and z. Note that network 600 does not include routers named as g or j. In the example shown in FIG. 6, four routers (routers d, u, o, and r, which are shaded in the figure) serve as anchors for a particular prefix. Note that the darker the shade, the smaller the lexicographic value of the router. In other words, router d has the smallest lexicographic value, whereas router r has the largest lexicographic value. Note that in FIG. 6 it is assumed that each link has a unit cost.

In FIG. 6, one or more tuples are listed in lexicographic order next to each router, with each tuple stating a distance to an anchor of the prefix and the identifier of that anchor. The first tuple (shown in darker font) in the list states the smallest distance to the prefix and the anchor with the smallest name among all anchors at that same distance. For example, three tuples are listed next to router q, stating that the distance from router q to anchor u is 1 (1 hop), the distance to anchor r is 2 (2 hops), and the distance to anchor d is 3 (3 hops). In other words, the smallest distance from router q to an anchor of the prefix is 1, and that smallest distance is to anchor u. On the other hand, there are two tuples listed next to router h, stating that the distance from router h to anchor d is 2 (2 hops), and the distance to anchor u is 2 (2 hops). Note that because router d has a smaller lexicographic value than router u, even though the distance is the same, router d is listed in the first tuple.

In some embodiments, updates from each router state only the preferred anchor (the first named anchor). In other words, each router pre-filters information it reports to its neighbors. For example, when the network changes resulting in router r becoming an anchor for the prefix, instead of reporting all anchors known at router e, an update from router e may only state router r as the anchor and distance as 1 to router r. In FIG. 6, each additional tuple next to a router, if any, states an alternative anchor for the prefix and the distance to it. These additional tuples are not reported by routers to their neighbots. In the example shown in FIG. 6, all routers are assumed to have received the most-recent sequence numbers from any of the anchors of the prefix.

The updates generated by an anchor propagate only as long as they provide routers with shorter paths to prefixes. In other words, an anchor updates status information associated with a local prefix by issuing an LSA, and by forwarding the LSA to its neighbors. The neighbors, however, forward such an LSA to their own neighbors only if such an LSA indicates a shorter path to the prefix. Hence, as the LSA is forwarded away from the originating anchor, it is less likely to provide a shorter path, given that there are other replicas in the network. In the example shown in FIG. 6, no routing update about the prefix propagates more than three hops, even though the network diameter is eight. In general, independently of how many anchors exist in a network for a given prefix, a router only has as many active anchors for a prefix as it has neighbors. This is the result of each router reporting only the best anchor it knows for each prefix. In FIG. 6, the arrowheads in the links between nodes indicate the router that is the next hop toward the prefix, and the links are identified by their shades and shapes. Arrows with dark solid lines indicate that those links point to router d, arrows with light solid lines indicate that those links point to router o, arrows with double lines indicate that those links point to router r, and arrows with dashed lines indicate that those links point to router u.

Note that even in this small network of just 24 routers, most routers have multiple paths to the prefix, with at least one being a shortest path. In FIG. 6, all links can be used to forward requests for content. One can see from FIG. 6 that none of the routers knows about all four of the anchors of the prefix (each of routers n, q, and e each knows three anchors). One can also see from FIG. 6 that traversing any possible directed path necessarily terminates at one of the anchors (anchor d, o, r, or u), without traversing a loop. It should be noted that, although the routes obtained with LCR are loop-free after the protocol finishes updating all routing tables, temporary loops may take place while routing tables in the network are inconsistent.

Depending on the ICN architecture, LCR can be implemented using different name-based signaling approaches. When implementing LCR in an ICN network, one needs to decide the naming convention of the routers, the syntax of the update messages, and how to exchange the update messages among neighboring routers.

In some embodiments, the routers can be named using a hierarchical name space. For example, a particular router can have a hierarchical name, such as "/<network>/<site>/<router>," and the LCR daemon running on the router can be named "/<network>/<site>/<router>/LCR."

The semantics of the update process in LCR can include a router sending incremental updates on its topology table to all its neighbors. In some embodiments, such an update message is identified by the name of the router, the protocol (LCR), the type of message, and a sequence number incremented by the sending router. The update messages can be sent periodically and serve as an indication that the router is operational. The syntax of the update messages and exactly how messages are exchanged between routers depend on the basic signaling defined in the ICN architecture in which LCR operates. The signaling among routers can be receiver-initiated or sender-initiated.

With receiver-initiated signaling, data follow an Interest stated by the receiver. The LCR process in a router using NDN or CCN must periodically send a "Routing Interest" (RI) to elicit routing updates from its neighbors. In contrast to NLSR, the state of each neighbor router is different; hence, LCR signaling cannot be based on synchronization messages. In some embodiments, a router sends an RI to each neighbor to request routing information. The RI can have a format such as: "/<network>/<site>/<router>/LCR/update/seq_no." A router receiving the RI can respond with a Content Object corresponding to a "Routing Update" (RU) with the updates made to its routing table since the last RI.

Sender-initiated signaling can include each router sending RUs to all its neighbors, without having to be asked explicitly by any one neighbor. Implementing this signaling approach is more efficient but requires adding a "push" mechanism in the data plane of some ICN architectures or changing the semantics of Interests. For example, "Hello" messages stating the presence of a router can be sent as long-term RIs to which multiple RUs can be sent by the same router as needed. Alternatively, an RU can be sent as an Interest containing updates as attributes. The RIs or RUs sent from a router inform its neighbors that the router is alive.

In some embodiments, an LCR update in CCN or NDN is digitally signed by the anchor that originates the update, and the update states information that can be used in signature verification. Hence, LCR can attest that the LSA regarding the prefix of local content is valid. In addition, various security mechanisms can be implemented for LCR.

Overhead Comparison

This section compares the performance of LCR with other name-based content routing approaches based on the time, communication, and storage complexities in the control plane. In the following discussion, the number of routers in the network is denoted as N and the number of network links is denoted as E. Moreover, the number of different name prefixes available in the network is denoted as C, the average number of replicas for a given name prefix is R, the average number of neighbors per router is l, and the network diameter is d.

For simplicity, we assume that a separate control message is sent for any given LSA or distance update. In practice, multiple LSAs and distance updates can be aggregated to conserve bandwidth. In fact, aggregating distance updates for multiple prefixes is easier than aggregating LSAs from multiple sources. However, given that the maximum size of a control message is a constant value independent of the growth of N or C, this aggregation does not change the order size of the overhead incurred by the routing protocols.

The communication complexity (CC) of a routing protocol is the number of messages that must be transmitted successfully for each router to have correct routing information about all the C prefixes. The time complexity (TC) of a routing protocol is the maximum time needed for all routers to have correct routing information for all prefixes when all messages are transmitted successfully. The storage complexity (SC) of a routing protocol is the maximum number of entries in the routing table of an arbitrary router. Given that the difference in the number of messages exchanged between neighbors with receiver-initiated or sender-initiated signaling is independent of N, C and R, the results demonstrated here can apply to both types of signaling approaches.

As discussed in the background section, NLSR and OSPFN use a link-state routing (LSR) approach. With LSR, an LSA originated by a router regarding a link or a name prefix must be sent to all the other routers in the network. Moreover, a router must transmit an LSA for each adjacent link and each prefix that is stored locally, each LSA must be flooded in the network, and each router must store a record for each link and prefix copy in the network. Accordingly, the time, communication, and storage complexities of LSR are:

$$TC_{LSR}=O(d);$$

$$CC_{LSR}=O(E \times R \times C + l \times E \times N);$$

$$SC_{LSR}=O(R \times C + E)$$

Now consider routing approaches that rely on the Distributed Hash Table (DHT). The most efficient DHT scheme is a virtual DHT with one-hop routing, in which routers run the DHT locally and maintain routes to all routers in the network. The communication complexity associated with publishing a prefix in the DHT and associating r sites with the prefix (to support routing to any or all copies of the prefix) is O(d*R×C), assuming no loops. The communication complexity of maintaining routes to all routers is O(l*N×E), given that link-state routing is typically used. The fastest possible propagation of routes to all routers is order O(d), and each router must store a record for as many prefixes as there are in the network. Therefore, the time, communication, and storage complexities of DHT are:

$$TC_{DHT}=O(d);$$

$$CC_{DHT}=O(d \times R \times C + l \times E \times N);$$

$$SC_{DHT}=O(C+E)$$

Now consider traditional distance-vector routing (DVR) approaches. Because DVR signaling can traverse long paths, and long-term loops and "counting to infinity" can occur, the basic distance-vector approach is known to have time complexity of $O(N)$ and communication complexity of $O(N^2)$. Furthermore, each router must store and communicate distance information about all prefix replicas and destination nodes in the network. Accordingly, the time, communication, and storage complexities of DVR are:

$$TC_{DVR}=O(N);$$

$$CC_{DVR}=O(N^2 \times R \times C);$$

$$SC_{DVR}=O(R \times C + N)$$

As one can see, the complexities of DVR are much worse than the LSR and DHT approaches. This explains why name-based routing using distance vectors has not been considered in the past.

On the other hand, with the LCR approach, the information a router communicates for a given prefix is independent of the number of anchors for a given prefix or routers in the network. More specifically, in LCR a router communicates, for a given prefix, only its distance to the nearest anchor of the prefix, plus the anchor name and the latest sequence number created by that anchor. As the number of replicas increases, the distance from a router to the nearest replica of a prefix actually decreases, and it is always the case that the number of hops (x) from any router to the nearest replica of a prefix is at most d hops. Furthermore, as discussed previously, LCR does not incur any routing-table loops. This means that: (1) any routing information propagates as fast as the shortest path between its origin and the recipient; and (2) the number of messages required for all routers to have a correct distance to a given prefix is O(E), regardless of the number of times the prefix is replicated (R). Given that there are C prefixes in the network, the complexity of LCR is:

$$TC_{LCR}=O(x);$$

$$CC_{LCR}=O(E \times C);$$

$$SC_{LCR}?=O(l \times C + E)$$

The above analysis clearly shows that LCR has far smaller storage complexity than LSR or DVR, because an LCR router only needs to store one entry for a prefix, rather than one entry for each prefix replica, and does not need to store any topology information. As R becomes O(N), LCR requires orders of magnitude less storage overhead than LSR or DVR, especially in large networks. Note that LCR is comparable to the DHT approach in terms of storage complexity in large networks. On the other hand, LCR has a much smaller time complexity and orders of magnitude smaller communication complexity when compared with the other approaches. More specifically, LCR allows routers to attain correct routing tables much faster than with DVR, LSR, and DHT, because routers only exchange updates about nearest prefix copies, rather than all copies, and such updates need to traverse paths that become much shorter than the network diameter as content replicas proliferate.

Computer and Communication System

Figure 7:
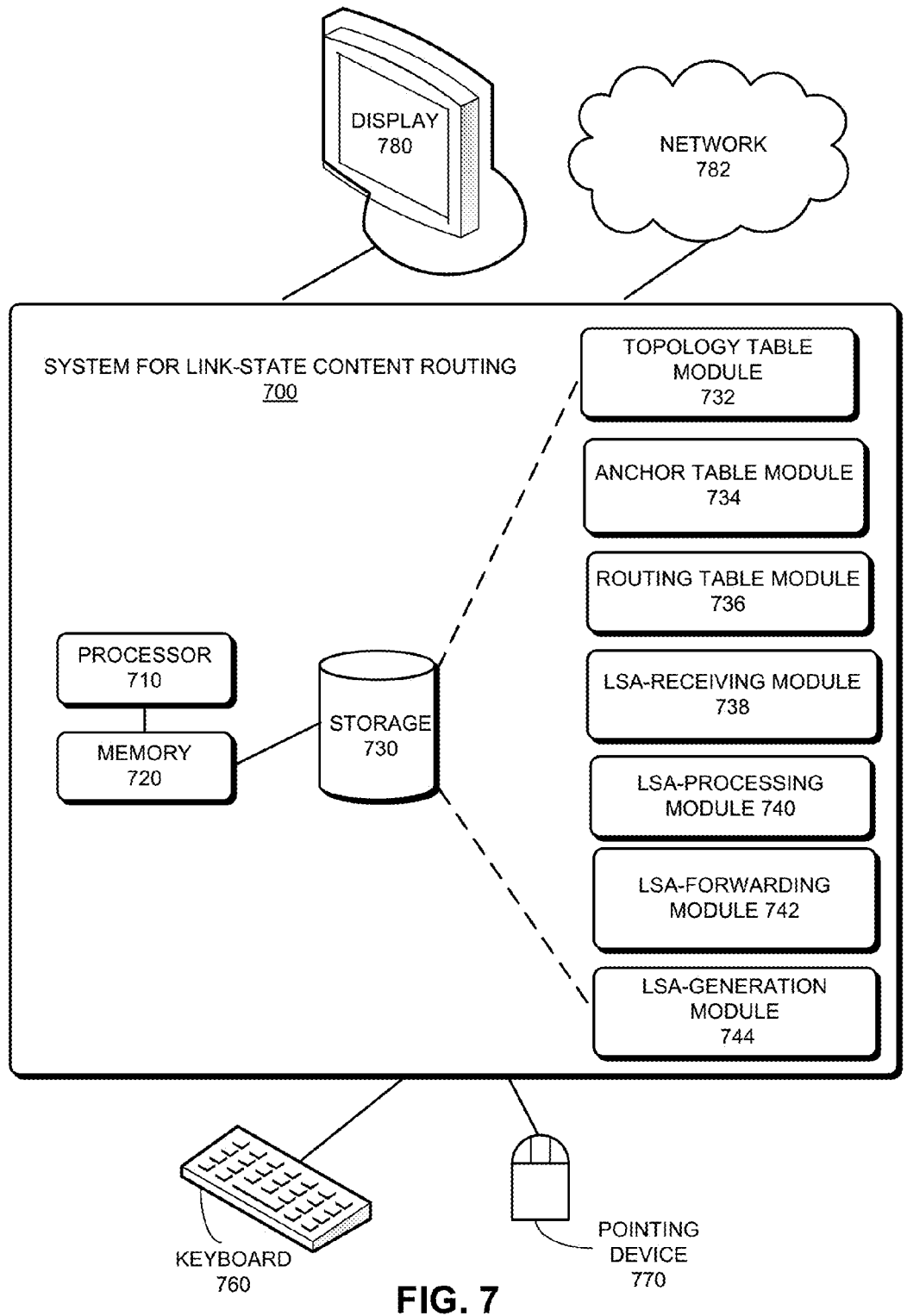
FIG. 7 illustrates an exemplary system for link-state content routing, in accordance with an embodiment of the present invention.

FIG. 7 illustrates an exemplary system for link-state content routing, in accordance with an embodiment of the present invention. A system 700 for link-state content routing comprises a processor 710, a memory 720, and a storage 730. Storage 730 typically stores instructions that can be loaded into memory 720 and executed by processor 710 to perform the methods mentioned above. In one embodiment, the instructions in storage 730 can implement a topology table module 732, an anchor table module 734, a routing table module 736, an LSA-receiving module 738, an LSA-processing module 740, an LSA-forwarding module 742, and an LSA-generation 744, all of which can be in communication with each other through various means.

In some embodiments, modules 732-744 can be partially or entirely implemented in hardware and can be part of processor 710. Further, in some embodiments, the system may not include a separate processor and memory. Instead, in addition to performing their specific tasks, modules 732-744, either separately or in concert, may be part of general- or special-purpose computation engines.

Storage 730 stores programs to be executed by processor 710. Specifically, storage 730 stores a program that implements a system (application) for link-state content routing. During operation, the application program can be loaded from storage 730 into memory 720 and executed by processor 710. As a result, system 700 can perform the functions described above. System 700 can be coupled to an optional display 780 (which can be a touchscreen display), keyboard 760, and pointing device 770, and can also be coupled via one or more network interfaces to network 782.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for updating link-status information associated with a prefix in an information-centric network (ICN), the method comprising:
    receiving, by a first node in the ICN, a link-state advertisement (LSA) message from a neighbor node, wherein the LSA message specifies a prefix and an anchor node advertising the specified prefix;
    identifying one or more valid next-hop neighbors to the prefix;
    determining whether each of the one or more valid next-hop neighbors is closer to the anchor node than the first node, by using a shortest-path first (SPF) algorithm to compute a distance between the anchor node and each of the one or more valid next-hop neighbors, to generate topology information;
    determining, based on the topology information stored on the first node, whether a shortest-path condition is met, wherein determining whether the shortest-path condition is met includes computing, using the SPF algorithm, a shortest distance from the first node to the specified prefix;
    in response to determining that a valid next-hop neighbor has a same distance to the anchor node as that of the first node, determining whether the valid next-hop neighbor has a smaller lexicographic value compared with that of the first node;
    in response to the shortest-path condition being met, forwarding the received LSA message to other neighbors of the first node; and
    in response to the shortest-path condition not being met, dropping the LSA message.

2. The method of claim 1, further comprising:
    generating, by the first node, an LSA message reflecting a status change to a local prefix; and
    forwarding the generated LSA message to neighbors of the first node.

3. The method of claim 1, wherein the topology information includes a routing table, the method further comprising: updating, by the first node, the routing table based on the received LSA message.

4. The method of claim 1, wherein the LSA message further includes a sequence number created by the anchor node, and wherein the sequence number increments each time the anchor node updates the LSA message for the specified prefix.

5. The method of claim 4, further comprising:
    determining whether the sequence number included in the LSA message is greater than a prior sequence number stored in the topology information.

6. The method of claim 5, further comprising:
    in response to determining that the sequence number included in the LSA message is not greater than a prior sequence number stored in the topology information, dropping the LSA message.

7. The method of claim 1, wherein the LSA message further includes a remaining lifetime value, and the method further comprises:
    determining whether the remaining lifetime value is greater than zero; and
    in response to determining that the remaining lifetime value is not greater than zero, dropping the LSA message.

8. A non-transitory computer-readable storage medium storing instructions that when executed by a computing device cause the computing device to perform a method for updating link-status information associated with a prefix in an information-centric network (ICN), the method comprising:
    receiving, by a first node in the ICN, a link-state advertisement (LSA) message from a neighbor node, wherein the LSA message specifies a prefix and an anchor node advertising the specified prefix;
    identifying one or more valid next-hop neighbors to the prefix;
    determining whether each of the one or more valid next-hop neighbors is closer to the anchor node than the first node, by using a shortest-path first (SPF) algorithm to compute a distance between the anchor node and each of the one or more valid next-hop neighbors, to generate topology information;

determining, based on the topology information stored on the first node, whether a shortest-path condition is met, wherein determining whether the shortest-path condition is met includes computing, using the SPF algorithm, a shortest distance from the first node to the specified prefix;

in response to determining that a valid next-hop neighbor has a same distance to the anchor node as that of the first node, determining whether the valid next-hop neighbor has a smaller lexicographic value compared with that of the first node;

in response to the shortest-path condition being met, forwarding the received LSA message to other neighbors of the first node; and in response to the shortest-path condition not being met, dropping the LSA message.

9. The non-transitory computer-readable storage medium of claim 8, wherein the method further comprises:

generating, by the first node, an LSA message reflecting a status change to a local prefix; and forwarding the generated LSA message to neighbors of the first node.

10. The non-transitory computer-readable storage medium of claim 8, wherein the topology information includes a routing table, and wherein the method further comprises updating, by the first node, the routing table based on the received LSA message.

11. The non-transitory computer-readable storage medium of claim 8, wherein the LSA message further includes a sequence number created by the anchor node, and wherein the sequence number increments each time the anchor node updates the LSA message for the specified prefix.

12. The non-transitory computer-readable storage medium of claim 11, wherein the method further comprises:

determining whether the sequence number included in the LSA message is greater than a prior sequence number stored in the topology information.

13. The non-transitory computer-readable storage medium of claim 12, wherein the method further comprises:

in response to determining that the sequence number included in the LSA message is not greater than a prior sequence number stored in the topology information, dropping the LSA message.

14. The non-transitory computer-readable storage medium of claim 8, wherein the LSA message further includes a remaining lifetime value, and the method further comprises:

determining whether the remaining lifetime value is greater than zero; and in response to determining that the remaining lifetime value is not greater than zero, dropping the LSA message.

15. A computer system for updating link-status information associated with a prefix in an information-centric network (ICN), the system comprising:

a processor; and a storage device coupled to the processor and storing instructions which when executed by the processor cause the processor to perform a method, the method comprising:

receiving, by a first node in the ICN, a link-state advertisement (LSA) message from a neighbor node, wherein the LSA message specifies a prefix and an anchor node advertising the specified prefix;

identifying one or more valid next-hop neighbors to the prefix;

determining whether each of the one or more valid next-hop neighbors is closer to the anchor node than the first node, by using a shortest-path first (SPF) algorithm to compute a distance between the anchor node and each of the one or more valid next-hop neighbors, to generate topology information;

determining, based on the topology information stored on the first node, whether a shortest-path condition is met, wherein determining whether the shortest-path condition is met includes computing, using the SPF algorithm, a shortest distance from the first node to the specified prefix;

in response to determining that a valid next-hop neighbor has a same distance to the anchor node as that of the first node, determining whether the valid next-hop neighbor has a smaller lexicographic value compared with that of the first node;

in response to the shortest-path condition being met, forwarding the received LSA message to other neighbors of the first node, and in response to the shortest-path condition not being met, dropping the LSA message.

16. The system of claim 15, wherein the method further comprises:

generating, by the first node, an LSA message reflecting a status change to a local prefix; and forwarding the generated LSA message to neighbors of the first node.

17. The system of claim 15, wherein the topology information includes a routing table, and wherein the method further comprises updating, by the first node, the routing table based on the received LSA message.

18. The system of claim 15, wherein the LSA message further includes a sequence number created by the anchor node, and wherein the sequence number increments each time the anchor node updates the LSA message for the specified prefix.

19. The system of claim 18, wherein the method further comprises:

determining whether the sequence number included in the LSA message is greater than a prior sequence number stored in the topology information.

20. The system of claim 19, wherein the method further comprises:

in response to determining that the sequence number included in the LSA message is not greater than a prior sequence number stored in the topology information, dropping the LSA message.

* * * * *